United States Patent
Hu et al.

(10) Patent No.: US 10,805,599 B2
(45) Date of Patent: Oct. 13, 2020

(54) DISPLAY SYSTEM, CONTENT GENERATOR, COMPUTING DEVICE, AND CONTROL METHOD THEREOF

(71) Applicant: Acer Incorporated, New Taipei (TW)

(72) Inventors: Chan-Yuan Hu, New Taipei (TW); Chao-Kuang Yang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 37 days.

(21) Appl. No.: 16/007,062

(22) Filed: Jun. 13, 2018

(65) Prior Publication Data
US 2019/0158817 A1    May 23, 2019

(30) Foreign Application Priority Data
Nov. 17, 2017  (TW) .............................. 106139889 A (51) Int. Cl.
*H04N 13/332*   (2018.01)
*H04N 5/232*    (2006.01)
*H04N 13/383*   (2018.01)
*H04N 13/194*   (2018.01)
*H04N 13/398*   (2018.01)
(Continued)

(52) U.S. Cl.
CPC ....... *H04N 13/332* (2018.05); *H04N 5/23238* (2013.01); *H04N 13/172* (2018.05); *H04N 13/194* (2018.05); *H04N 13/344* (2018.05); *H04N 13/361* (2018.05); *H04N 13/383* (2018.05); *H04N 13/398* (2018.05)

(58) Field of Classification Search
CPC .. H04N 13/344; H04N 13/361; H04N 13/332; H04N 13/172; H04N 5/232; H04N 13/194; H04N 13/398; H04N 13/383
See application file for complete search history.

(56) References Cited

U.S. PATENT DOCUMENTS

| | | | |
|---|---|---|---|
| 2006/0274206 A1* | 12/2006 | Jang ..................... | H04N 5/45 348/565 |
| 2009/0009424 A1* | 1/2009 | Kang ..................... | H04N 5/45 345/1.3 |

(Continued)

FOREIGN PATENT DOCUMENTS

| | | |
|---|---|---|
| CN | 105511095 A | 4/2016 |
| TW | 201736906 A | 10/2017 |

OTHER PUBLICATIONS

Chinese language office action dated Dec. 24, 2018, issued in application No. TW 106139889.

*Primary Examiner* — Md N Haque
*Assistant Examiner* — Berteau Joisil
(74) *Attorney, Agent, or Firm* — McClure, Qualey & Rodack, LLP (57) ABSTRACT

A display system includes a content generator, an HMD (Head Mounted Display), and a computing device. The content generator generates image/video information. The HMD obtains a viewing-angle range relative to a user. The computing device is coupled to the HMD. The computing device receives the image/video information and the viewing-angle range. The computing device controls the HMD to display a main screen and a sub-screen according to the image/video information. The computing device adjusts the transparency of the sub-screen by comparing the viewing-angle range with an important-angle range.

16 Claims, 9 Drawing Sheets

(51) Int. Cl.
*H04N 13/172* (2018.01)
*H04N 13/344* (2018.01)
*H04N 13/361* (2018.01)

(56) References Cited

U.S. PATENT DOCUMENTS

| | | | |
|---|---|---|---|
| 2013/0242030 A1* | 9/2013 | Kato | H04N 21/44209 348/14.07 |
| 2017/0299867 A1 | 10/2017 | Tsai et al. | |
| 2018/0077451 A1* | 3/2018 | Yip | H04N 5/23238 |
| 2018/0093185 A1* | 4/2018 | Black | A63F 13/26 |

* cited by examiner

DISPLAY SYSTEM, CONTENT GENERATOR, COMPUTING DEVICE, AND CONTROL METHOD THEREOF

CROSS REFERENCE TO RELATED APPLICATIONS

This Application claims priority of Taiwan Patent Application No. 106139889 filed on Nov. 17, 2017, the entirety of which is incorporated by reference herein.

BACKGROUND OF THE INVENTION

Field of the Invention

The disclosure generally relates to a display system, and specifically, to a display system for automatically adjusting screen transparency.

Description of the Related Art

With the popularity of live-streams, more and more 360-degree live-stream shows have appeared, and they provide immersive environments for users. However, audiences can observe a picture from only one specific angle during a conventional 360-degree live-stream. If audiences pay attention for background pictures instead of the streamer, they may lose important information relative to the streamer. Accordingly, there is a need to propose a novel display system for solving the problems of the prior art.

BRIEF SUMMARY OF THE INVENTION

In a preferred embodiment, the invention is directed to a display system including a content generator, an HMD (Head Mounted Display), and a computing device. The content generator generates image/video information. The HMD obtains a viewing-angle range relative to the user. The computing device is coupled to the HMD. The computing device receives the image/video information and the viewing-angle range. The computing device controls the HMD to display a main screen and a sub-screen according to the image/video information. The computing device adjusts transparency of the sub-screen by comparing the viewing-angle range with an important-angle range.

In some embodiments, the content generator is a 360-degree camera.

In some embodiments, the computing device is a notebook computer.

In some embodiments, the important-angle range is a default value stored in the computing device.

In some embodiments, the computing device further obtains a head file from the content generator, and the head file includes the important-angle range.

In some embodiments, the display device further includes a cloud device. The content generator uploads the image/video information and the head file to the cloud device, and the computing device downloads the image/video information and the head file from the cloud device.

In some embodiments, if a difference between the viewing-angle range and the important-angle range becomes smaller, the transparency of the sub-screen becomes higher, and if the difference between the viewing-angle range and the important-angle range becomes larger, the transparency of the sub-screen becomes lower.

In another preferred embodiment, the invention is directed to a content generator used together with an HMD (Head Mounted Display). The content generator includes a lens and a processor. The lens obtains image/video information. The processor provides a head file. The head file includes an important-angle range. The HMD obtains a viewing-angle range relative to a user, and displays a main screen and a sub-screen according to the image/video information. Transparency of the sub-screen is adjusted by comparing the viewing-angle range with the important-angle range.

In some embodiments, the content generator further includes a communication unit coupled to the lens and the processor. The communication unit uploads the image/video information and the head file to a cloud device.

In another preferred embodiment, the invention is directed to a computing device for controlling an HMD (Head Mounted Display). The computing device includes a connection port and a processor. The connection port is coupled to the HMD. The processor is coupled to the connection port. The processor receives a viewing-angle range relative to a user from the HMD. The processor controls the HMD to display a main screen and a sub-screen according to image/video information. The processor adjusts transparency of the sub-screen by comparing the viewing-angle range with an important-angle range.

In some embodiments, the computing device further includes a storage device for storing a default value. The default value includes the important-angle range.

In some embodiments, the computing device further includes a communication unit coupled to the processor. The communication unit downloads the image/video information and the head file from a cloud device.

In another preferred embodiment, the invention is directed to a control method. The control method includes the steps of: providing a content generator, wherein the content generator is used together with an HMD (Head Mounted Display); obtaining, via the content generator, image/video information; and providing, via the content generator, a head file, wherein the head file includes an important-angle range. The HMD obtains a viewing-angle range relative to a user, and displays a main screen and a sub-screen according to the image/video information. Transparency of the sub-screen is adjusted by comparing the viewing-angle range with the important-angle range.

In another preferred embodiment, the invention is directed to a control method. The control method includes the steps of: providing a computing device, wherein the computing device is arranged for controlling an HMD (Head Mounted Display); receiving, via the computing device, a viewing-angle range relative to a user from the HMD; controlling, via the computing device, the HMD to display a main screen and a sub-screen according to image/video information; and comparing, via the computing device, the viewing-angle range with an important-angle range, so as to adjust the transparency of the sub-screen.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
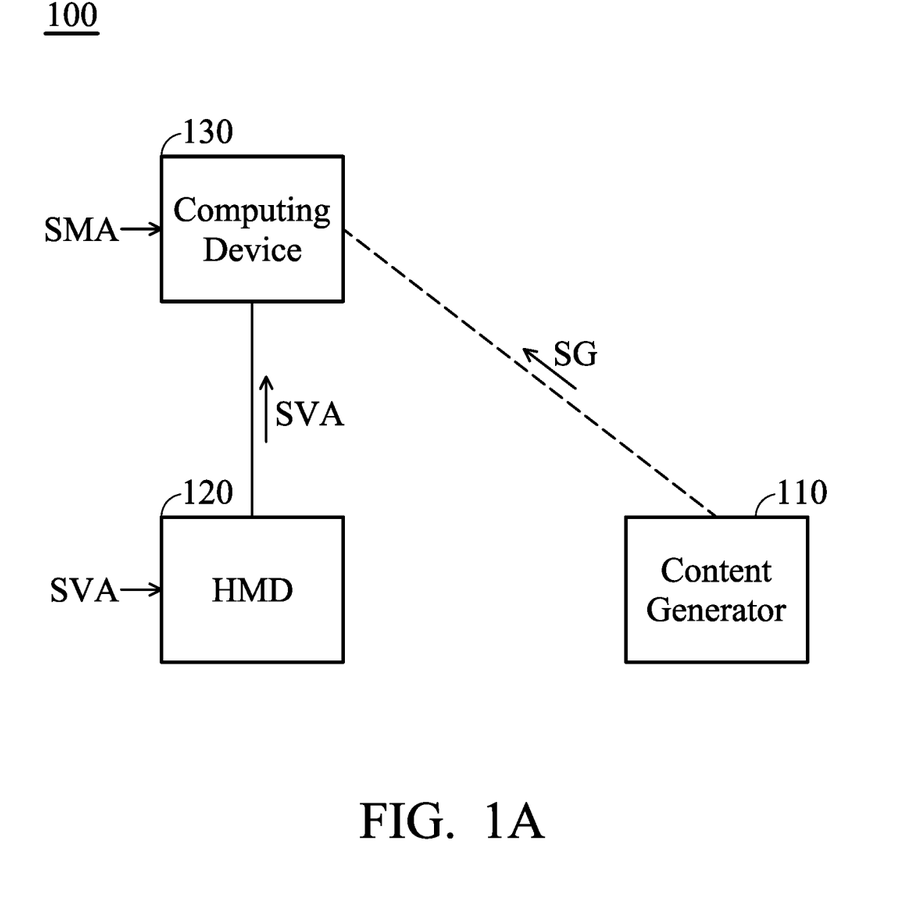
FIG. 1A is a diagram of a display system according to an embodiment of the invention.

FIG. 1A is a diagram of a display system 100 according to an embodiment of the invention. As shown in FIG. 1A, the display system 100 includes a content generator 110, an HMD (Head Mounted Display) 120, and a computing device 130. The content generator 110 may be a 360-degree camera or an image/video storage device, and it is configured to generate image/video information SG. For example, the image/video information SG may be relative to a 360-degree panoramic picture or video, and it may include static picture information, dynamic video information, or a combination thereof. The HMD 120 may be applicable to VR (Virtual Reality) techniques, and may be worn by a user. The computing device 130 may be a desktop computer or a mobile device, such as a notebook computer, a smart phone, or a tablet computer.

The HMD 120 can obtain a viewing-angle range SVA relative to a user. The so-called "viewing-angle range SVA" means an angle range within which the eyes of the user can observe. For example, when the user wears the HMD 120, the HMD 120 can detect a head rotation angle of the user, and accordingly estimate the viewing-angle range SVA of the user. The computing device 130 may be coupled to the HMD 120 by wired, wireless, direct, or indirect means, so as to receive the viewing-angle range SVA. In addition, the computing device 130 may be coupled to the content generator 110 by wired, wireless, direct, or indirect means, so as to receive the image/video information SG.

Figure 1B:
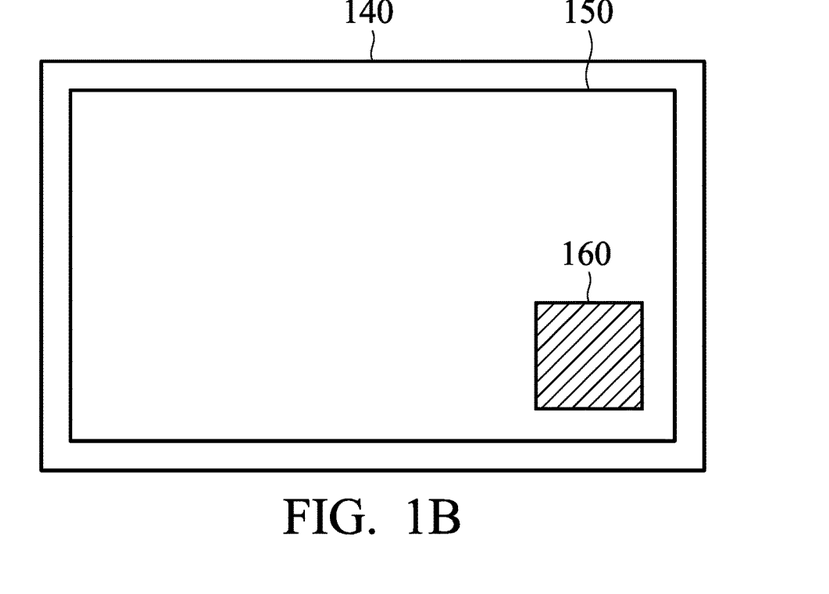
FIG. 1B is a diagram of a display device of an HMD (Head Mounted Display) according to an embodiment of the invention.

The computing device 130 controls the HMD 120 to display a main screen 150 and a sub-screen 160 according to the image/video information SG (the so-called "screen" over the disclosure may mean a visual (virtual) image/video displayed on a physical display device, such as the HMD 120). FIG. 1B is a diagram of a display device 140 of the HMD 120 according to an embodiment of the invention. As shown in FIG. 1B, the display device 140 of the HMD 120 can display the main screen 150 and the sub-screen 160 at the same time. The contents of the main screen 150 and the sub-screen 160 may be both determined according to the image/video information SG. The size of the main screen 150 may be larger than the size of the sub-screen 160. The main screen 150 and the sub-screen 160 may include different display contents. In some embodiments, the main screen 150 includes a display portion of a 360-degree panoramic picture or video within the viewing-angle range SVA. Since the viewing-angle range SVA is dynamically adjusted according to the user's head rotation angle, the user staring at the main screen 150 can feel an immersive VR environment. In some embodiments, the sub-screen 160 includes another display content, such as an important parameter value or another display portion of the aforementioned 360-degree panoramic picture or video within an important-angle range SMA. The computing device 130 adjusts the transparency of the sub-screen 160 by comparing the viewing-angle range SVA with the important-angle range SMA (i.e., the transparency of the sub-screen 160 is adjusted according to a comparison between the viewing-angle range SVA and the important-angle range SMA).

Figure 1C:
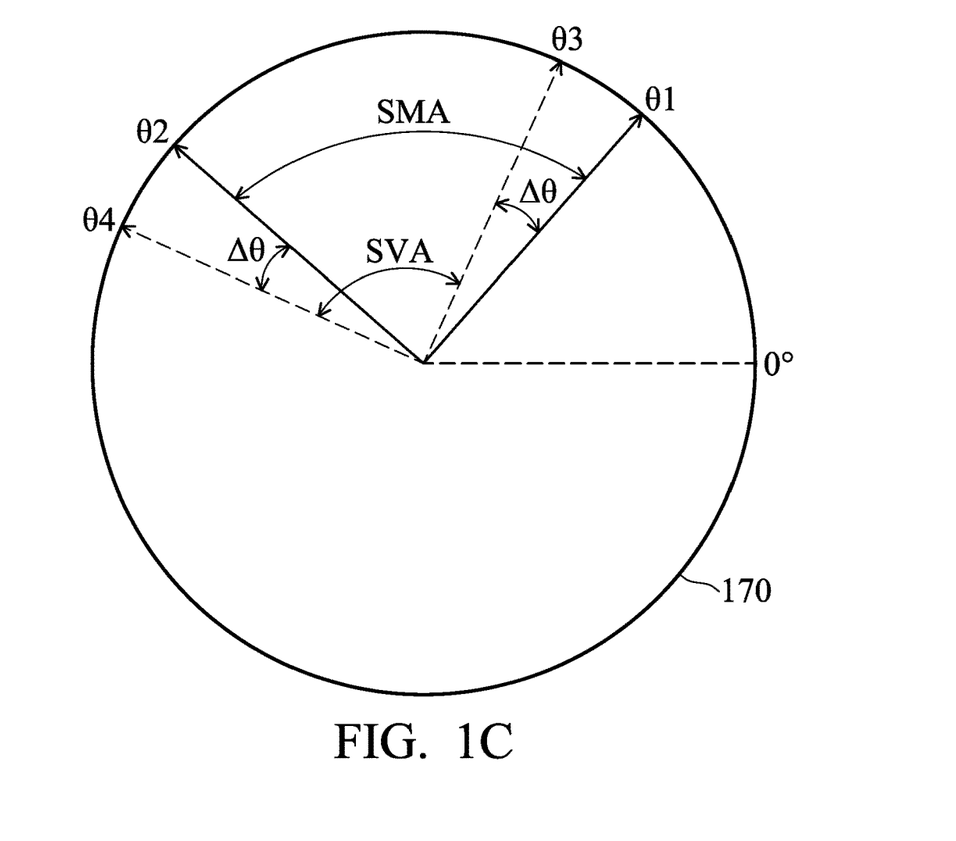
FIG. 1C is a diagram of a viewing-angle range and an important-angle range according to an embodiment of the invention.

FIG. 1C is a diagram of the viewing-angle range SVA and the important-angle range SMA according to an embodiment of the invention. With respect to the user's feeling, the aforementioned 360-degree panoramic picture or video may be considered as an image/video which is uniformly distributed over a circumference of a circle 170. The user wearing the HMD 120 can be positioned at a center of the circle 170, so as to observe the image/video on the circumference. If the user wearing the HMD 120 feels a virtual sphere, the aforementioned circle 170 may be any circular section of the virtual sphere, such as a horizontal circular section or a vertical circular section, but it is not limited thereto. A viewing-angle range of the user can be defined by connecting the center of the circle 170 to any two points on the circumference (any reference point may be set as a zero degree). In some embodiments, when the user's head rotation angle is changed, the viewing-angle range SVA is adjusted; therefore, the main screen 150 displayed on the HMD 120 and observed by the user is also changed. For example, the main screen 150 may be a display portion of the 360-degree panoramic picture or video within the viewing-angle range SVA. The viewing-angle range SVA has an initial angle θ3 and a final angle θ4. For example, an angle difference between the final angle θ4 and the initial angle θ3 may be 90 degrees, but it is not limited thereto. It should be noted that the initial angle θ3 and the final angle θ4 are both changed according to the user's head rotation angle. For example, if the head of the user is toward a front direction, the initial angle θ3 may be 45 degrees and the final angle θ4 may be 135 degrees; if the head of the user is rotated toward a left-side direction, the initial angle θ3 may be 135 degrees and the final angle θ4 may be 225 degrees. On the other hand, the sub-screen 160 may be another display portion of the 360-degree panoramic picture or video within the important-angle range SMA. The important-angle range SMA has an initial angle θ1 and a final angle θ2. For example, an angle difference between the final angle θ2 and the initial angle θ1 may be 90 degrees, but it is not limited thereto. It should be noted that the initial angle θ1 and the final angle θ2 are not changed by the user's head rotation. The important image/video of the 360-degree panoramic picture or video (e.g., a face of the streamer, or a blackboard of a classroom) may be between the final angle θ2 and the initial angle θ1. As shown in FIG. 1C, there is a difference value Δθ between the viewing-angle range SVA and the important-angle range SMA. The difference value Δθ represents the angle difference between the main screen 150 and the sub-screen 160, and the computing device 130 can adjust the transparency of the sub-screen 160 according to the difference value Δθ. If the viewing-angle range SVA and the important-angle range SMA have the same sizes (e.g., both of them have 90-degree sizes), the difference value Δθ will be defined according to the following equations (1) and (2).

Δθ=|θ3−θ1|　　　(1)

Δθ=|θ4−θ2|　　　(2)

where "Δθ" represents the difference value between the viewing-angle range SVA and the important-angle range SMA, "|θ3−θ1|" represents the absolute value of the angle difference between the initial angle θ3 of the viewing-angle range SVA and the initial angle θ1 of the important-angle range SMA, and "|θ4−θ2|" represents the absolute value of the angle difference between the final angle θ4 of the viewing-angle range SVA and the final angle θ2 of the important-angle range SMA. If the viewing-angle range SVA and the important-angle range SMA have different sizes (the so-called "size" means the angle difference between the final angle and the initial angle) (e.g., one of the viewing-angle range SVA and the important-angle range SMA has a 90-degree size, and another of the viewing-angle range SVA and the important-angle range SMA has a 100-degree size), the aforementioned difference value Δθ may be defined according to either the equation (1) or the equation (2).

In some embodiments, if the difference value Δθ between the viewing-angle range SVA and the important-angle range SMA becomes smaller, the transparency of the sub-screen 160 will become higher. This represents the content of the main screen 150 is similar to that of the sub-screen 160. The visual interference due to the sub-screen 160 can be avoided by increasing the transparency of the sub-screen 160. Conversely, if the difference value Δθ between the viewing-angle range SVA and the important-angle range SMA becomes larger, the transparency of the sub-screen 160 will become lower. This represents the content of the main screen 150 is significantly different from that of the sub-screen 160. The visual effect of the sub-screen 160 can be emphasized by decreasing the transparency of the sub-screen 160. For example, if the transparency T of the sub-screen 160 is from 0 to 1 (e.g., "1" represents a completely transparent screen, and "0" represents a completely opaque screen"), the transparency T can be calculated according to the following equation (3).

$$T = 1 - \frac{\Delta\theta}{|\theta 2 - \theta 1|} \quad (3)$$

where "T" represents the transparency of the sub-screen 160, "Δθ" represents the difference value between the viewing-angle range SVA and the important-angle range SMA, and "|θ2−θ1|" represents the absolute value of the angle difference between the final angle θ2 and the initial angle θ1 of the important-angle range SMA. It should be noted that if the aforementioned ratio $$\text{``} \frac{\Delta\theta}{|\theta 2 - \theta 1|} \text{''}$$

is greater than 1, the transparency T will be redefined as 0 (i.e., there is no negative transparency).

For example, it is assumed that the absolute value of the angle difference between the final angle θ2 and the initial angle θ1 of the important-angle range SMA (i.e., |θ2−θ1|) is exactly equal to 90 degrees. The following Table I will be used to illustrate how the transparency T of the sub-screen 160 is determined according to the difference value Δθ between the viewing-angle range SVA and the important-angle range SMA.

TABLE I

Relationship Between Difference value Δθ and Transparency T

| Difference Value (Δθ) | Transparency (T) |
| --- | --- |
| 0 degrees | 1 |
| 10 degrees | 8/9 |
| 20 degrees | 7/9 |
| 30 degrees | 6/9 |
| 40 degrees | 5/9 |
| 50 degrees | 4/9 |
| 60 degrees | 3/9 |
| 70 degrees | 2/9 |
| 80 degrees | 1/9 |
| 90 degrees | 0 |
| 100 degrees | 0 |

It should be understood that Table I is merely exemplary. As a matter of fact, the absolute value of the angle difference between the final angle θ2 and the initial angle θ1 of the important-angle range SMA (i.e., |θ2−θ1|) is adjustable according to different requirements, and it is not limited to 90 degrees.

Figure 2A:
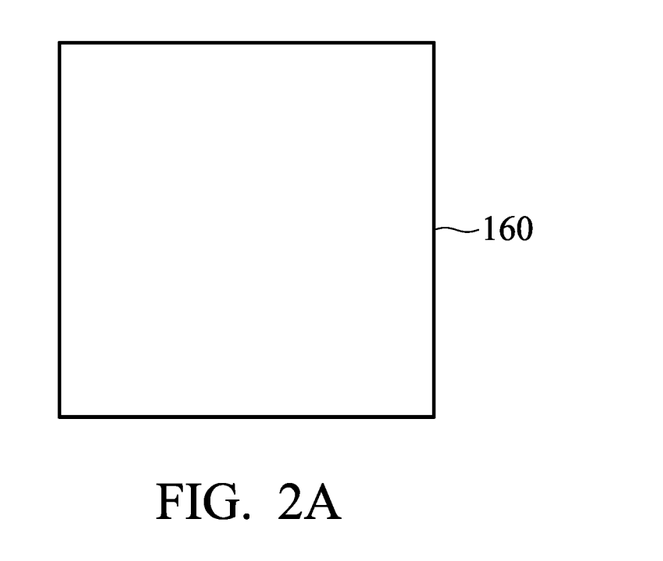
FIG. 2A is a diagram of a sub-screen according to an embodiment of the invention.
Figure 2B:
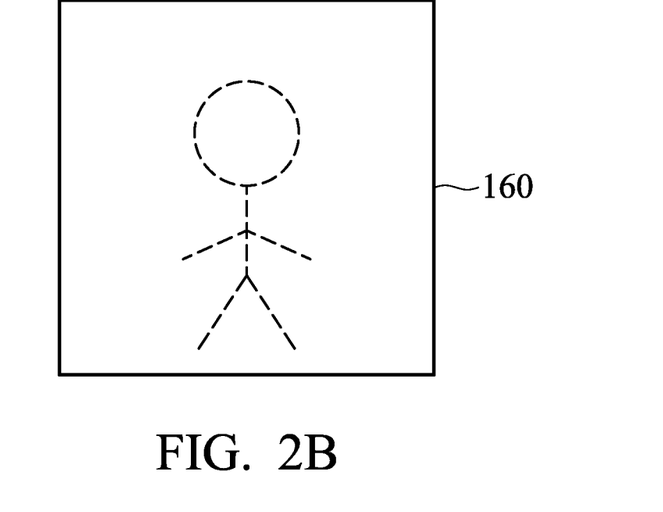
FIG. 2B is a diagram of a sub-screen according to another embodiment of the invention.
Figure 2C:
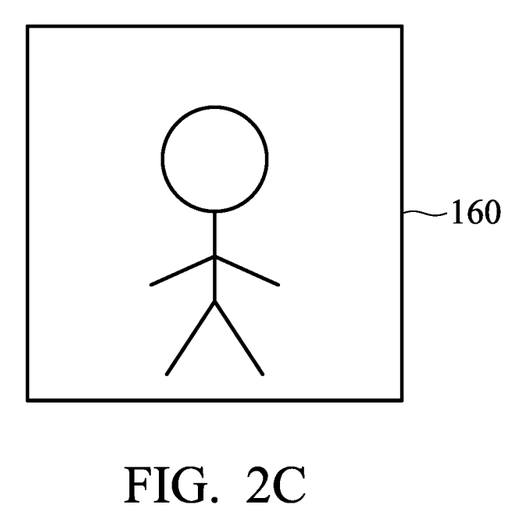
FIG. 2C is a diagram of a sub-screen according to another embodiment of the invention.

FIG. 2A is a diagram of the sub-screen 160 according to an embodiment of the invention. In the embodiment of FIG. 2A, the difference value Δθ between the viewing-angle range SVA and the important-angle range SMA is equal to 0 degrees, and accordingly the transparency T of the sub-screen 160 is 1. FIG. 2B is a diagram of the sub-screen 160 according to another embodiment of the invention. In the embodiment of FIG. 2B, the difference value Δθ between the viewing-angle range SVA and the important-angle range SMA is equal to 50 degrees, and accordingly the transparency T of the sub-screen 160 is 4/9. FIG. 2C is a diagram of the sub-screen 160 according to another embodiment of the invention. In the embodiment of FIG. 2C, the difference value Δθ between the viewing-angle range SVA and the important-angle range SMA is equal to 90 degrees, and accordingly the transparency T of the sub-screen 160 is 0. According to the comparison between FIG. 2A, FIG. 2B, and FIG. 2C, the important-angle range SMA may be arranged toward a streamer who is shown in the 360-degree panoramic picture or video (i.e., the body shape displayed in the sub-screen 160). When the user wearing the HMD 120 rotates and deviates from the important-angle range SMA (i.e., the difference value Δθ becomes larger), the transparency T of the sub-screen 160 quickly becomes lower, such that the user can still observe the clear image/video of the streamer displayed in the sub-screen 160 (as shown in FIG. 2C). Conversely, when the user wearing the HMD 120 rotates and gradually faces the important-angle range SMA (i.e., the difference value Δθ becomes smaller), the transparency T of the sub-screen 160 quickly becomes higher, such that the sub-screen 160 does not tend to interfere with the main screen 150 (as shown in FIG. 2A).

In some embodiments, the important-angle range SMA is a default value stored in the computing device 130. In alternative embodiments, other devices can provide the important-angle range SMA for the computing device 130, without affecting the performance of the invention.

Figure 3:
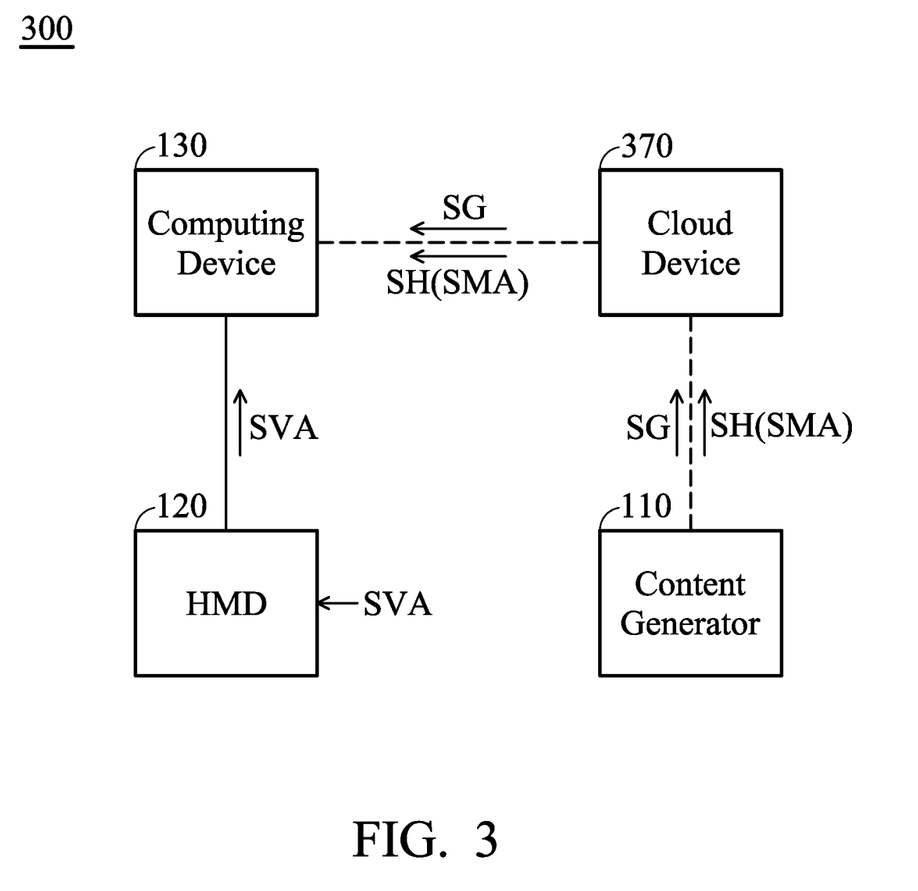
FIG. 3 is a diagram of a display system according to an embodiment of the invention.

FIG. 3 is a diagram of a display system 300 according to an embodiment of the invention. As shown in FIG. 3, in addition to the content generator 110, the HMD 120, and the computing device 130, the display system 300 further includes a cloud device 370. The cloud device 370 may be a network server or a content platform (e.g., the YouTube platform), and it may be implemented with a software or a hardware device. The content generator 110 and the computing device 130 can access the data stored in the cloud device 370 through a wired network or a wireless network. In the embodiment of FIG. 3, the computing device 130 further obtains a head file SH from the content generator 110, and the head file SH includes the important-angle range SMA. That is, the content generator 110 can determine what the important-angle range SMA is according to the image/video information SG (e.g., the image/video information SG relative to the 360-degree panoramic picture or video). For example, if the streamer is positioned within an angle range from 0 to 90 degrees of the 360-degree panoramic picture or video, the final angle θ2 of the important-angle range SMA may be set as 90 degrees, and the initial angle θ1 of the important-angle range SMA may be set as 0 degrees. The content generator 110 can upload the image/video information SG and the head file SH to the cloud device 370, and then the computing device 130 can download the image/video information SG and the head file SH from the cloud device 370. However, the invention is not limited to the above. In other embodiments, the computing device 130 is directly electrically connected to the content generator 110, so as to receive the image/video information SG and the head file SH therefrom. Other features of the display system 300 of FIG. 3 are similar to those of the display system 100 of FIG. 1A. Therefore, the two embodiments can achieve similar levels of performance.

Figure 4:
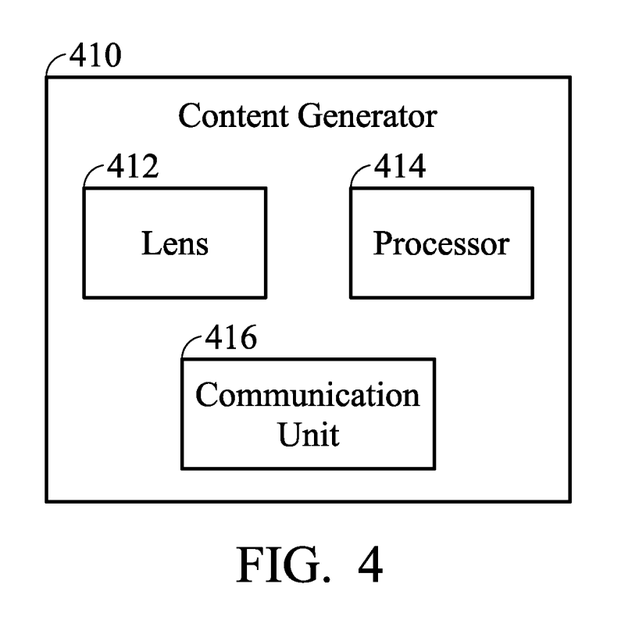
FIG. 4 is a diagram of a content generator according to an embodiment of the invention.

FIG. 4 is a diagram of a content generator 410 according to an embodiment of the invention. The content generator 410 may be used independently, or may be applied to the display system 100 of FIG. 1A or the display system 300 of FIG. 3. For example, the content generator 410 may be a 360-degree camera, and it may be used together with the aforementioned HMD 120. In the embodiment of FIG. 4, the content generator 410 at least includes a lens 412 and a processor 414. For example, the lens 412 may be a picture camera lens or a video camera lens. The lens 412 is configured to obtain image/video information SG, which may be relative to a 360-degree panoramic picture or video. The processor 414 provides a head file SH. The head file SH includes an important-angle range SMA. The important-angle range SMA may be determined by the processor 414 according to the image/video information SG. The HMD 120 can obtain a viewing-angle range SVA relative to a user, and display a main screen 150 and a sub-screen 160 according to the image/video information SG. The transparency of the sub-screen 160 is adjusted by comparing the viewing-angle range SVA with the important-angle range SMA. For example, if the difference value Δθ between the viewing-angle range SVA and the important-angle range SMA becomes smaller, the transparency of the sub-screen 160 will become higher. Conversely, if the difference value Δθ between the viewing-angle range SVA and the important-angle range SMA becomes larger, the transparency of the sub-screen 160 will become lower. Generally, the content generator 410 can provide the image/video information SG and the important-angle range SMA to other devices for further processing. In some embodiments, the content generator 410 further includes a communication unit 416. The communication unit 416 can establish a wired or wireless connection to the cloud device 370. For example, the communication unit 416 may be coupled to the lens 412 and the processor 414, and the communication unit 416 can further upload the image/video information SG and the head file SH to the cloud device 370. It should be noted that the communication unit 416 is an optional element, which is removable in other embodiments. Other features of the content generator 410 are similar to those of the above embodiments, and they will not be illustrated again here.

Figure 5:
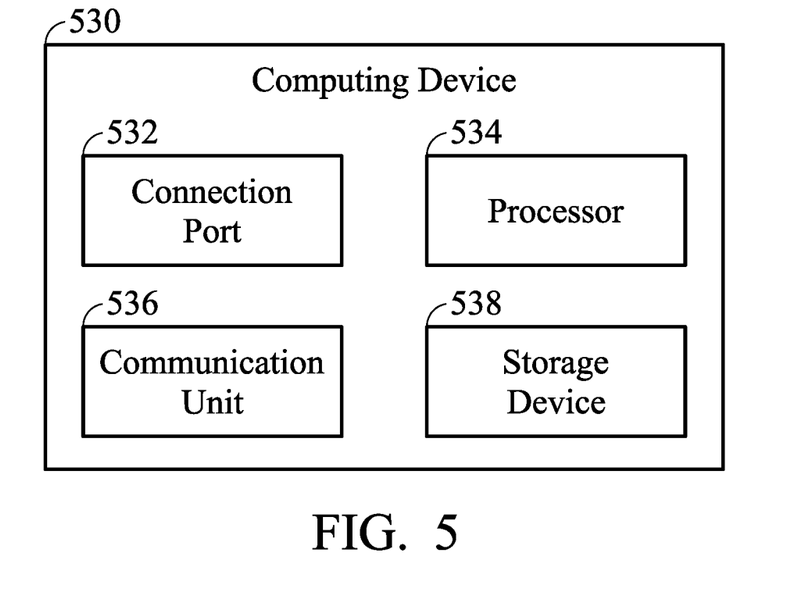
FIG. 5 is a diagram of a computing device according to an embodiment of the invention.

FIG. 5 is a diagram of a computing device 530 according to an embodiment of the invention. The computing device 530 may be used independently, or may be applied to the display system 100 of FIG. 1A or the display system 300 of FIG. 3. For example, the computing device 530 may be a notebook computer, and it can be used to control the aforementioned HMD 120. In the embodiment of FIG. 5, the computing device 530 at least includes a connection port 532 and a processor 534. For example, the connection port 532 may be a USB (Universal Serial Bus) connection port, a Micro-USB connection port, a USB Type-C connection port, or a wireless connection unit. The connection port 532 is coupled to the HMD 120. The processor 534 is coupled to the connection port 532. The processor 534 receives a viewing-angle range SVA relative to a user from the HMD 120. The processor 534 controls the HMD 120 to display a main screen 150 and a sub-screen 160 according to image/video information SG. In addition, the processor 534 adjusts the transparency of the sub-screen 160 by comparing the viewing-angle range SVA with an important-angle range SMA. For example, if a difference value Δθ between the viewing-angle range SVA and the important-angle range SMA becomes smaller, the transparency of the sub-screen 160 will become higher. Conversely, if the difference value Δθ between the viewing-angle range SVA and the important-angle range SMA becomes larger, the transparency of the sub-screen 160 will become lower. Generally, the computing device 530 can further process the image/video information SG and the important-angle range SMA, thereby controlling the HMD 120. In some embodiments, the computing device 530 further includes a storage device 538 for storing a default value. The default value includes the important-angle range SMA. In alternative embodiments, the computing device 530 includes a communication unit 536 for receiving a head file SH from other devices, and the head file SH includes the important-angle range SMA. The communication unit 536 is coupled to the processor 534. The communication unit 536 can download the image/video information SG and the head file SH from the cloud device 370. It should be noted that the storage device 538 and the communication unit 536 are optional elements, which are removable in other embodiments. Other features of the computing device 530 are similar to those of the above embodiments, and they will not be illustrated again here.

Figure 6:
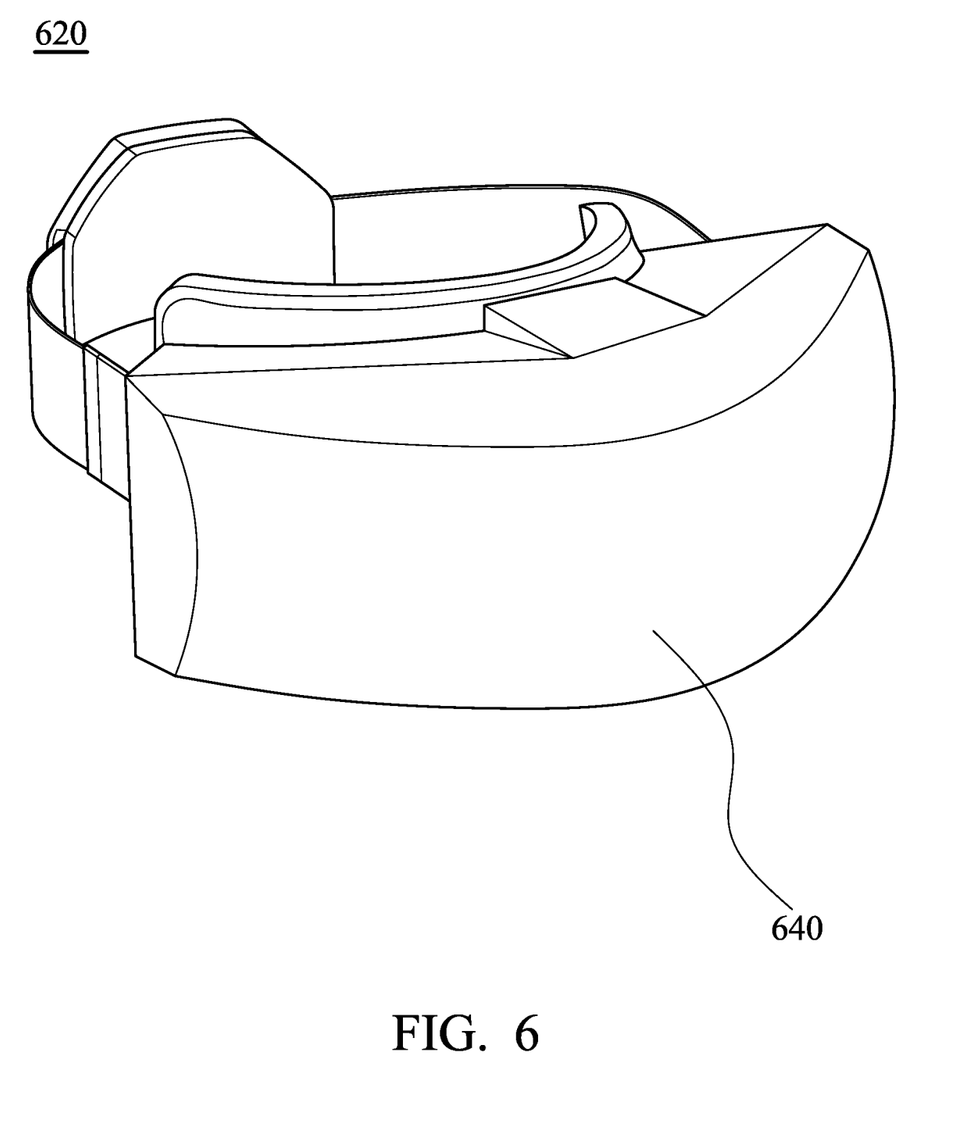
FIG. 6 is a perspective view of an HMD according to an embodiment of the invention.

FIG. 6 is a perspective view of an HMD 620 according to an embodiment of the invention. In the embodiment of FIG. 6, a display device 640 of the HMD 620 is configured to display the aforementioned main screen 150 and the aforementioned sub-screen 160. It should be noted that FIG. 6 is merely exemplary to illustrate a practical product of the HMD 620. The shape and type of the HMD 620 are not limited in the invention.

Figure 7:
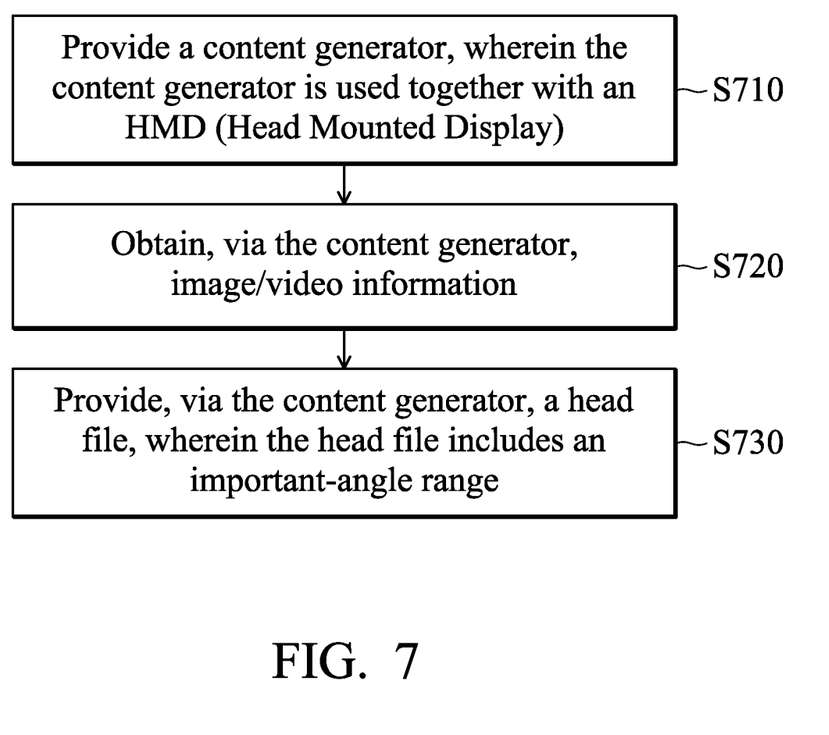
FIG. 7 is a flowchart of a control method of a content generator according to an embodiment of the invention.

FIG. 7 is a flowchart of a control method of a content generator according to an embodiment of the invention. The control method of FIG. 7 includes the following steps. In step S710, a content generator is provided. The content generator is used together with an HMD (Head Mounted Display). In step S720, image/video information is obtained via the content generator. The HMD obtains a viewing-angle range relative to a user, and displays a main screen and a sub-screen according to the image/video information. In step S730, a head file is provided via the content generator. The head file includes an important-angle range. The transparency of the sub-screen is adjusted by comparing the viewing-angle range with the important-angle range. It should be noted that the above steps are not required to be performed in order, and every device feature of FIGS. 1 to 6 can be applied to the control method of FIG. 7.

Figure 8:
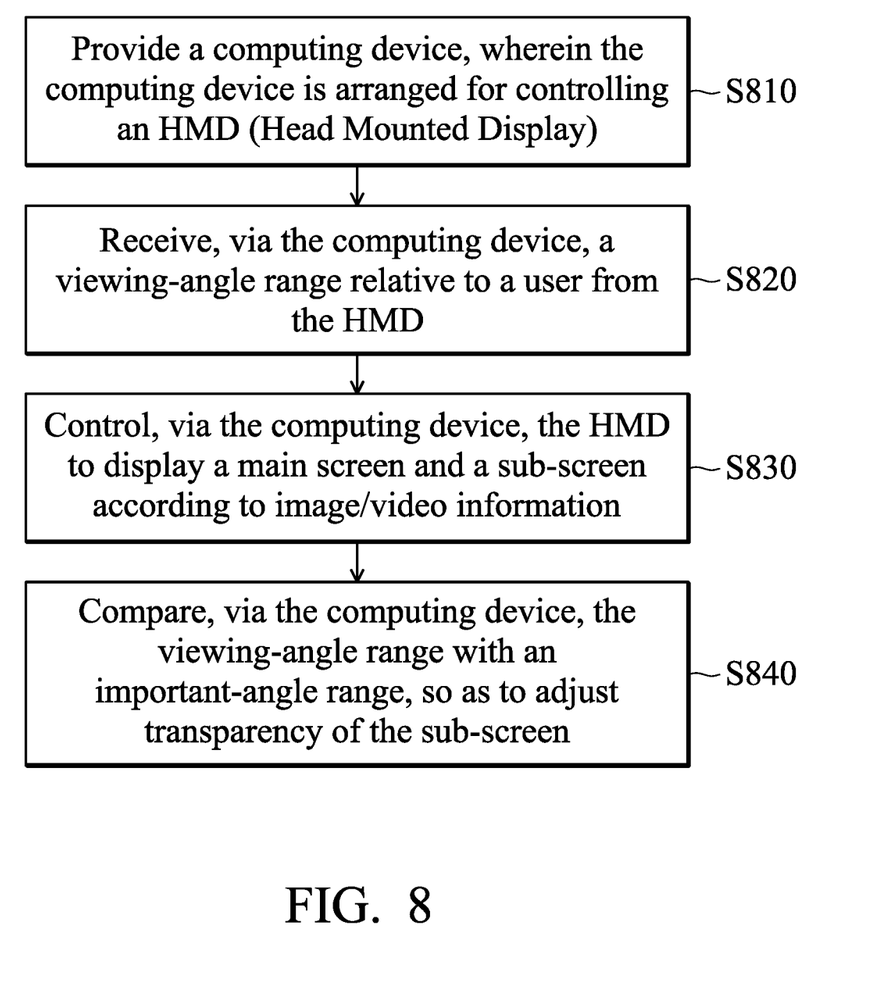
FIG. 8 is a flowchart of a control method of a computing device according to an embodiment of the invention.

FIG. 8 is a flowchart of a control method of a computing device according to an embodiment of the invention. The control method of FIG. 8 includes the following steps. In step S810, a computing device is provided. The computing device is arranged for controlling an HMD (Head Mounted Display). In step S820, a viewing-angle range relative to a user is received from the HMD via the computing device. In step S830, the HMD is controlled via the computing device to display a main screen and a sub-screen according to image/video information. In step S840, the viewing-angle range is compared with an important-angle range via the computing device, so as to adjust the transparency of the sub-screen. It should be noted that the above steps are not required to be performed in order, and every device feature of FIGS. 1 to 6 can be applied to the control method of FIG. 8.

The invention proposes a novel display system, a novel content generator, a novel computing device, and a novel control method thereof. With the design of the invention, no matter how a user's head rotates, the user wearing an HMD (Head Mounted Display) will not loss important information in a main screen and a sub-screen. The transparency of the sub-screen is dynamically adjusted according to the rotation angle of the user's head, so as to achieve the best visual performance. Therefore, the invention is suitable for application in a variety of VR (Virtual Reality) systems.

Note that the above element parameters are not limitations of the invention. A designer can adjust these settings or values according to different requirements. It should be understood that the display system, the content generator, the computing device, and the control method of the invention are not limited to the configurations of FIGS. 1-8. The invention may merely include any one or more features of any one or more embodiments of FIGS. 1-8. In other words, not all of the features shown in the figures should be implemented in the display system, the content generator, the computing device, and the control method of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A display system, comprising:
a content generator, generating image/video information;
a HMD (Head Mounted Display), obtaining a viewing-angle range relative to a user; and
a computing device, coupled to the HMD, and receiving the image/video information and the viewing-angle range;
wherein the computing device controls the HMD to display a main screen and a sub-screen according to the image/video information;
wherein the computing device adjusts transparency of the sub-screen by comparing the viewing-angle range with an important-angle range;
wherein if a difference between the viewing-angle range and the important-angle range becomes smaller, the transparency of the sub-screen becomes higher; and if the difference between the viewing-angle range and the important-angle range becomes larger, the transparency of the sub-screen becomes lower;
wherein if the difference between the viewing-angle range and the important-angle range is 0, the transparency of the sub-screen is set to 1; and if the difference between the viewing-angle range and the important-angle range is equal to or greater than 90 degrees, the transparency of the sub-screen is set to 0;
wherein the transparency of the sub-screen is calculated according to the following equation:

$$T = 1 - \frac{\Delta \theta}{|\theta 2 - \theta 1|}$$

wherein "T" represents the transparency of the sub-screen, "$\Delta\theta$" represents a difference value between the viewing-angle range and the important-angle range, and "$|\theta 2-\theta 1|$" represents an absolute value of an angle difference between a final angle and an initial angle of the important-angle range.

2. The display system as claimed in claim 1, wherein the content generator is a 360-degree camera.

3. The display system as claimed in claim 1, wherein the computing device is a notebook computer.

4. The display system as claimed in claim 1, wherein the important-angle range is a default value stored in the computing device.

5. The display system as claimed in claim 1, wherein the computing device further obtains a head file from the content generator, and the head file comprises the important-angle range.

6. The display system as claimed in claim 5, further comprising:
a cloud device, wherein the content generator uploads the image/video information and the head file to the cloud device, and the computing device downloads the image/video information and the head file from the cloud device.

7. A content generator used together with an HMD (Head Mounted Display), comprising:
a lens, obtaining image/video information; and
a processor, providing a head file, wherein the head file comprises an important-angle range;
wherein the HMD obtains a viewing-angle range relative to a user, and displays a main screen and a sub-screen according to the image/video information;
wherein transparency of the sub-screen is adjusted by comparing the viewing-angle range with the important-angle range;
wherein if a difference between the viewing-angle range and the important-angle range becomes smaller, the transparency of the sub-screen becomes higher, and if the difference between the viewing-angle range and the important-angle range becomes larger, the transparency of the sub-screen becomes lower;
wherein if the difference between the viewing-angle range and the important-angle range is 0, the transparency of the sub-screen is set to 1, and if the difference between the viewing-angle range and the important-angle range is equal to or greater than 90 degrees, the transparency of the sub-screen is set to 0;
wherein the transparency of the sub-screen is calculated according to the following equation:

$$T = 1 - \frac{\Delta\theta}{|\theta 2 - \theta 1|}$$

wherein "T" represents the transparency of the sub-screen, "$\Delta\theta$" represents a difference value between the viewing-angle range and the important-angle range, and "$|\theta 2 - \theta 1|$" represents an absolute value of an angle difference between a final angle and an initial angle of the important-angle range.

8. The content generator as claimed in claim 7, wherein the content generator is a 360-degree camera.

9. The content generator as claimed in claim 7, further comprising:
a communication unit, coupled to the lens and the processor, wherein the communication unit uploads the image/video information and the head file to a cloud device.

10. A computing device for controlling an HMD (Head Mounted Display), comprising:
a connection port, coupled to the HMD; and
a processor, coupled to the connection port, and receiving a viewing-angle range relative to a user from the HMD;
wherein the processor controls the HMD to display a main screen and a sub-screen according to image/video information;
wherein the processor adjusts transparency of the sub-screen by comparing the viewing-angle range with an important-angle range;
wherein if a difference between the viewing-angle range and the important-angle range becomes smaller, the transparency of the sub-screen becomes higher, and if the difference between the viewing-angle range and the important-angle range becomes larger, the transparency of the sub-screen becomes lower;
wherein if the difference between the viewing-angle range and the important-angle range is 0, the transparency of the sub-screen is set to 1, and if the difference between the viewing-angle range and the important-angle range is equal to or greater than 90 degrees, the transparency of the sub-screen is set to 0;
wherein the transparency of the sub-screen is calculated according to the following equation:

$$T = 1 - \frac{\Delta\theta}{|\theta 2 - \theta 1|}$$

wherein "T" represents the transparency of the sub-screen, "$\Delta\theta$" represents a difference value between the viewing-angle range and the important-angle range, and "$|\theta 2 - \theta 1|$" represents an absolute value of an angle difference between a final angle and an initial angle of the important-angle range.

11. The computing device as claimed in claim 10, wherein the computing device is a notebook computer.

12. The computing device as claimed in claim 10, further comprising:
a storage device, storing a default value, wherein the default value comprises the important-angle range.

13. The computing device as claimed in claim 10, wherein the computing device further receives a head file, and the head file comprises the important-angle range.

14. The computing device as claimed in claim 13, further comprising:
a communication unit, coupled to the processor, wherein the communication unit downloads the image/video information and the head file from a cloud device.

15. A control method, comprising the steps of:
providing a content generator, wherein the content generator is used together with an HMD (Head Mounted Display);
obtaining, via the content generator, image/video information; and
providing, via the content generator, a head file, wherein the head file comprises an important-angle range;
wherein the HMD obtains a viewing-angle range relative to a user, and displays a main screen and a sub-screen according to the image/video information;
wherein transparency of the sub-screen is adjusted by comparing the viewing-angle range with the important-angle range;
wherein if a difference between the viewing-angle range and the important-angle range becomes smaller, the transparency of the sub-screen becomes higher, and if the difference between the viewing-angle range and the important-angle range becomes larger, the transparency of the sub-screen becomes lower;
wherein if the difference between the viewing-angle range and the important-angle range is 0, the transparency of the sub-screen is set to 1, and if the difference between the viewing-angle range and the important-angle range is equal to or greater than 90 degrees, the transparency of the sub-screen is set to 0;
wherein the transparency of the sub-screen is calculated according to the following equation:

$$T = 1 - \frac{\Delta\theta}{|\theta 2 - \theta 1|}$$

wherein "T" represents the transparency of the sub-screen, "$\Delta\theta$" represents a difference value between the viewing-angle range and the important-angle range, and "|θ2−θ1|" represents an absolute value of an angle difference between a final angle and an initial angle of the important-angle range.

16. A control method, comprising the steps of:
providing a computing device, wherein the computing device is arranged for controlling an HMD (Head Mounted Display);
receiving, via the computing device, a viewing-angle range relative to a user from the HMD;
controlling, via the computing device, the HMD to display a main screen and a sub-screen according to image/video information; and
comparing, via the computing device, the viewing-angle range with an important-angle range, so as to adjust transparency of the sub-screen;
wherein if a difference between the viewing-angle range and the important-angle range becomes smaller, the transparency of the sub-screen becomes higher, and if the difference between the viewing-angle range and the important-angle range becomes larger, the transparency of the sub-screen becomes lower;
wherein if the difference between the viewing-angle range and the important-angle range is 0, the transparency of the sub-screen is set to 1, and if the difference between the viewing-angle range and the important-angle range is equal to or greater than 90 degrees, the transparency of the sub-screen is set to 0;
wherein the transparency of the sub-screen is calculated according to the following equation:

$$T = 1 - \frac{\Delta\theta}{|\theta2 - \theta1|}$$

wherein "T" represents the transparency of the sub-screen, "Δθ" represents a difference value between the viewing-angle range and the important-angle range, and "|θ2−θ1|" represents an absolute value of an angle difference between a final angle and an initial angle of the important-angle range.

* * * * *